United States Patent [19]

Lemelson

[11] 4,237,364
[45] Dec. 2, 1980

[54] WELDING TOOL AND METHOD

[76] Inventor: Jerome H. Lemelson, 85 Rector St., Metuchen, N.J. 08840

[21] Appl. No.: 831,778

[22] Filed: Sep. 9, 1977

Related U.S. Application Data

[63] Continuation-in-part of Ser. No. 825,698, Aug. 18, 1977.

[51] Int. Cl.$^3$ .............................................. B23K 26/02
[52] U.S. Cl. ........................ 219/121 LC; 219/121 LU
[58] Field of Search ...... 219/121 L, 121 LM, 85 BA, 219/85 BM, 349, 230, 121 LC, 121 LU

[56] References Cited

U.S. PATENT DOCUMENTS

| | | | |
|---|---|---|---|
| 2,364,730 | 12/1944 | Leskin | 219/349 |
| 3,242,314 | 3/1966 | Eckles | 219/121 L |
| 3,392,259 | 7/1968 | Meier | 219/121 L |
| 3,404,350 | 10/1968 | Muncheryan | 219/121 L |
| 3,427,433 | 2/1969 | Foreman et al. | 219/85 BA |
| 3,463,898 | 8/1969 | Takaoka et al. | 219/121 L |
| 3,622,743 | 11/1971 | Muncheryan | 219/121 L |
| 3,631,623 | 1/1972 | Platt | 219/121 L |
| 3,718,800 | 2/1973 | Costello | 219/85 BA |
| 3,821,510 | 6/1974 | Muncheryan | 219/121 L |

*Primary Examiner*—B. A. Reynolds
*Assistant Examiner*—Clifford C. Shaw

[57] ABSTRACT

A welding tool and a method are provided for welding various materials. In one form the tool is a manually held device containing a laser for generating an intense radiant energy beam capable of melting and welding metal. A monostable switch is conveniently operated by the finger of the hand to energize the laser. The tool contains a forwardly protruding portion for engaging the work. Sensing means, such as a switch or transducer is operable to sense when the end of the tool engages the work and permits operation of the laser only upon such work engagement. In a particular form, the work engaging portion of the tool is operable to engage a nut or head of a fastener for prepositioning the tool to permit the beam energy generated thereby to selectively weld the fastener to the work. In another form, the tool engaging means is operable to indicate to the operator of the tool the location of the work to be intersected by the radiant energy beam. The tool may also be employed to compress the work prior to welding. In still another form, a welding material, such as powdered metal, welding strip or rod or a pellet, is fed into the beam or against the surface of the work from the tool to be melted by the beam and to operate in welding, brazing or sodering the work. Other forms of radiation such as an electron beam may be employed and generated by means located within the tool for welding the work.

7 Claims, 8 Drawing Figures

WELDING TOOL AND METHOD

RELATED APPLICATIONS

This is a continuation-in-part of Ser. No. 825,698 filed Aug. 18, 1977 for Method of Fastening and Fastener Used Therefore.

SUMMARY OF THE INVENTION

This invention relates to welding tools and a method for welding work by means of intense radiation. In particular, the invention is directed to a manually operable welding tool, preferably of the type which may be hand-held and which may be predeterminately located with respect to work to be welded thereby. In one form of the invention, the tool is operable to spot weld parts of fasteners, such as the head, shank or nut of a bolt fastener to the work or to other fastener components so as to lock or seal the fastener to the work.

Various welding tools have been developed employing such forms of heat generation as electrical resistance, electrical arc, the burning of gases, and induction energy to effect a localized melting and fusion of welding materials such as metal. The instant invention is directed to a hand-held and hand operated welding tool employing pulsed radiant energy in the form of a beam, such as generated by a laser or an electron gun, which may be predeterminately directed at a localized area of a work or assembly of components and employed to spot weld the components together without distorting or overheating adjacent material. Other forms of heat generating means, such as resistance or induction heating, gas flames or the like, dissipate a substantial amount of energy for some distance from the area being welded and may therefore distort, destroy or cause corrosion of adjacent portions of the work. However, the instant invention employs beamed radiant energy which may be generated for sufficiently short periods of time so as to substantially heat only that portion of the work to be welded and to dissipate a minimum amount of energy to adjacent portions so as to prevent heat corrosion or distortion thereof.

Accordingly, it is a primary object of this invention to provide a new and improved welding tool and a method for welding material.

Another object is to provide a manually held and manually operated welding tool employing pulsed radiant energy.

Another object is to provide a manually operated welding tool for generating intense radiant energy capable of melting metal wherein the tool contains a safety interlock for preventing its operation when it is not operatively located with respect to a surface to be welded.

Another object is to provide a hand-held welding tool having a gun shaped housing with a pistol grip and a trigger operated switch for activating a beam generating means located in the tool and including an indicating means at the end of the tool for predeterminately locating the tool to permit the beam thereof to intersect a predetermined area of the work.

Another object is to provide a welding tool which is particularly applicable for spot welding fasteners, such as bolts, screws and nuts to work for locking such fasteners in place.

Another object is to provide a welding tool for fasteners which includes means for prepositioning the tool with respect to the head or body of a fastener to permit the predetermined welding thereof.

Another object is to provide a welding tool for fasteners which is also operable to hold the fasteners in place against work.

Another object is to provide a welding tool for fasteners which is also operable to turn and tighten a fastener against the work.

With the above and such other objects in view as may hereinafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

Figure 1:
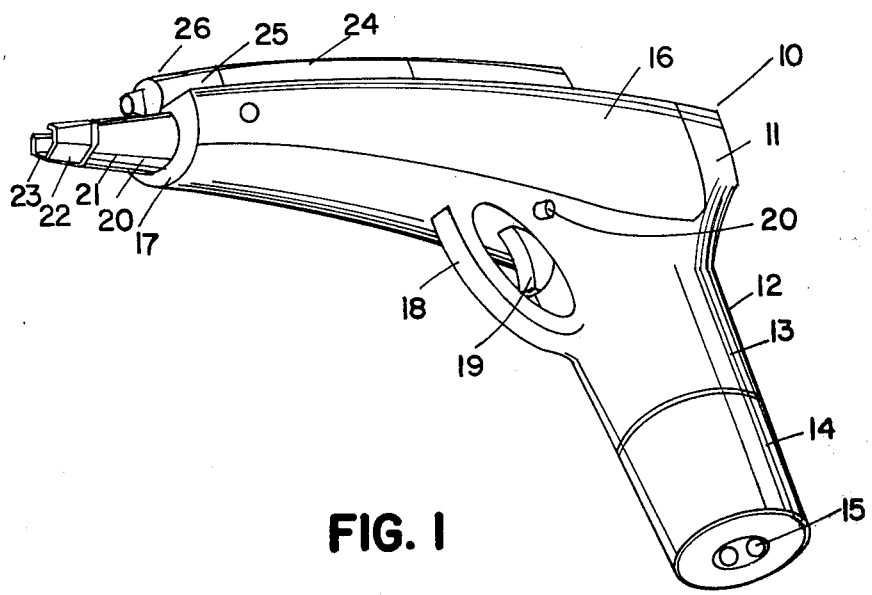
FIG. 1 is an isometric view of a hand-held welding tool which employs an intense radiation beam for spot welding a portion of a fastener to a work piece.
Figure 2:
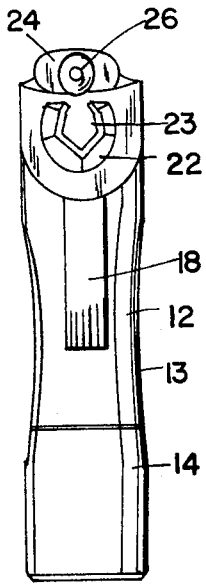
FIG. 2 is a end view of the tool of FIG. 1.

In FIGS. 1 and 2 is shown a hand-held welding tool 10 having a housing 11 formed with a handle portion 12 in the form of a pistol grip 13, the lower portion 14 of which contains either a battery or a connection means for connecting the electrically driven components of the welding tool with a source of electrical energy such as line current. Notation 15 refers to electrical receptacles provided in or adjacent the bottom wall of the section 14 for receiving the prongs of a male plug for either conducting electrical energy to the components of the tool adapted to utilize same or for recharging the battery in the handle.

The upper portion 16 of the housing 11 extends forwardly of the handle in the manner of the barrel of a gun and contains supported thereabove subhousing portions denoted 24 and 25. Located within subhousing portion 25 is an electron beam generator or a laser having its output end 26 adapted to pass an intense radiation beam, preferably although not necessarily, as a pulse of welding radiant energy denoted B in FIG. 3. Subhousing portion 24 preferably contains elements associated with the laser 25 such as a pulsing control and/or amplifying or transformer circuits for supplying electrical energy to the laser in subhousing portion 25 at sufficient potential to drive the laser and cause it to generate an intense pulse of beam radiation when a switch operated by a trigger 19 is closed when the trigger is pulled.

Protruding outwardly from the front end walls 17 of the housing 11 is a receptacle 20 having a rear portion 21 and a front portion 22 defining a forward open rim 23 configured to circumscribe and retain a nut or the head of a fastener engaged within the rim 23 so as to preposition the fastener head or nut with respect to the beam generated on the output 26 of the laser in housing 25.

Figure 3:
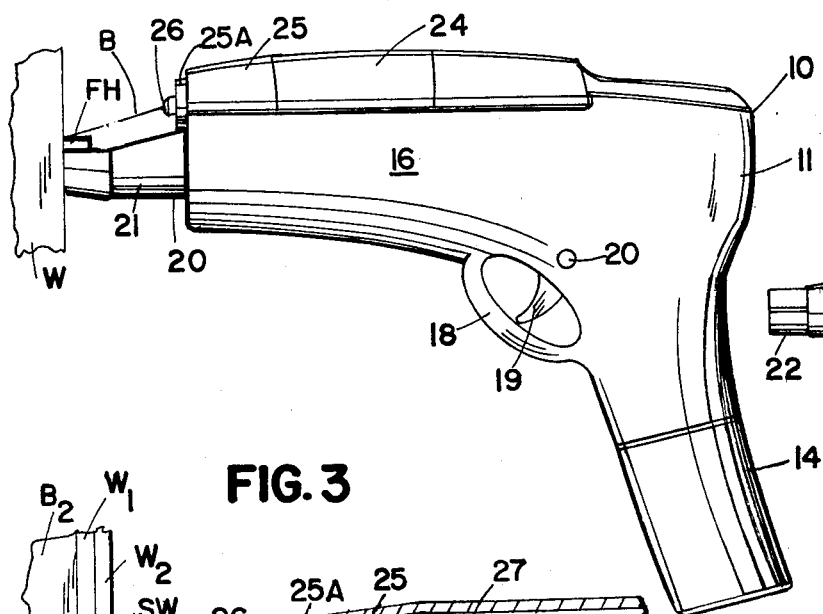
FIG. 3 is a side view of the tool of FIGS. 1 and 2 in the act of welding a fastener to a work piece.

When so located within the confines of the retainer 22, the nut or fastener head has a select peripheral portion thereof aligned with the laser in housing 25 such that the intense radiation beam B directed from the operating end 26 of the laser, will intersect a portion of the nut or fastener head, denoted FH in FIG. 3, and an adjacent portion of the surface of the work so as to spot weld the rim of the fastener head to the surface of the work W. When such spot welding has been effected, the fastener will not only be retained in place so that its other end may be utilized for fastening, such as by deforming same or tightening a nut thereon, but will also be prevented from unscrewing or prematurely vibrating loose from the work when the work assembly W is performing the operations. The weld, which may be one or more spot welds, formed between the fastener head FH and the work, may be of such a characteristic as to normally retain the fastener assembled against the work in a manner such that it may be removed from the work by a turning or wrenching action thereon. Since the fastener FH will be primarily subjected to tension forces and vibrations, not a torque which would turn the head FH or nut attached thereto in a manner to loosen same, the described spot welding of the fastener to the work or to itself by means of the tool 10 will suffice, for many applications, to retain the fastener in assembly with the work without loosening or unturning.

Additional features of the tool or welding gun 10 of FIGS. 1-3 are noted as follows. A bi-stable switch (not shown) is located within housing 11 and, when closed, energizes the laser located within housing 25 with amplified electrical energy provided by the battery within the lower removeable portion 14 of the housing 11 so as to cause a pulsed beam B of electrical energy to be directed from the output 26 of the laser to the selected portion of the fastener and/or work W. A safety interlock preventing operation of the switch which is actuated by pulling the trigger 19 located within the trigger guard 18, includes a bi-stable push button 20 which, when depressed inwardly, locks the trigger 19 to prevent its movement.

Figure 5:
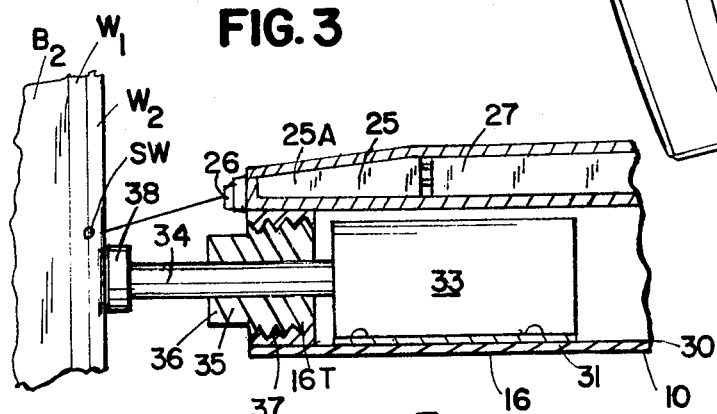
FIG. 5 is a side view in cross section of the working end of a welding tool which is a modified form of the tool shown in FIGS. 1-3 and is adapted to permit the safe welding of work pieces.

A second safety feature, details of which are illustrated in FIG. 5, includes the mounting of the prepositioning and support assembly 20 moveable at the end of the housing 11 wherein, when the assembly 20 is urged toward housing 11 by engagement of the rim 23 of the nut holding portion 22 thereof against a unit of work, it will actuate a normally open mono-stable switch located within a housing 33 and to cause same to close permitting the laser in housing 25 to be activated thereafter when the trigger 19 is pulled. In other words, the prepositioning and holding unit 21 is moveable with respect to the housing 11 and is normally spring biased outwardly therefrom to maintain the limit switch, which it is engageable against, in an open condition until the end of assembly 20 defined by rim 23 is forced against the surface of the work to be welded which moves assembly rearwardly through a guide formed in the end of housing 11 and causes the compressive closure of a limit switch permitting the laser to be operated thereafter as will be described.

Figure 4:
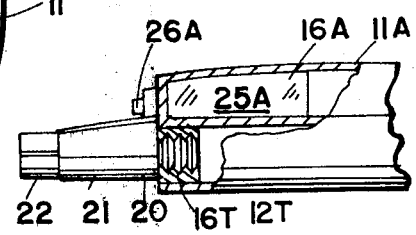
FIG. 4 is a fragmentary view with parts broken away for clarity of a modified form of the tool of FIG. 3.

Various different assemblies 20, or the fastener retaining end portion 22 thereof, are preferably removably secured to the ed of the gun to permit the accommodation of fasteners of different shapes. Accordingly, the retaining end portion 22, which is illustrated as being open at the top permits the pulsed radiation beam B of the laser or electron gun 25A to be directed against the peripheral portion of the head FH of the fastener which is exposed and extends beyond the opening at the upper end of the retainer, as shown in FIG. 3. Either the retainer 22 may be removably secured to the end of the base 21 to permit different retainers for accommodating different fastener heads, nuts or other articles to be removably seucred from 21 or the end portion 21T of the base 21 may be threaded, as shown in FIG. 4, and secured within a threaded opening 16T at the end of the barrel portion 16 of the housing 11 to permit it to be removed and replaced by other fittings which are shaped at their ends to accommodate various articles to be welded.

In FIG. 5 is shown a modification to the end portion of the barrel 16 of the welding gun 10 permitting it to be employed as a hand-held welding tool for spot welding or performing other welding, abrading or cutting operations with respect to work pieces such as two sheets W1 and W2 which are shown as abutted against a support or substrate B2. Supported within the interior volume 30 near the nose end of the barrel 16 against the bottom wall 31 thereof is a normally open limit switch 33 having an elongated actuator 34 protruding longitudinally therefrom and slideably engaged in the bore 36 of a bushing 35 which is threaded at 37 and retained within the threaded portion 16T at the end of barrel 16. The end of actuator 34 contains a head 38 adapted to engage the outer surface of the work piece W2 and when the gun is forced by hand to compress head 38 against the work, the actuator 34 is forced and caused to move through the bushing 35 toward the limit switch 33 and, in so doing, to actuate and close the contacts of the limit switch. When the normally open spring biased contacts of the limit switch 33 are closed and the trigger 19 of the gun is pulled closing a second normally open limit switch, the laser 25A will generate its beam B and direct it at a location of the work which may be indicated at a location of the head 38 of the shaft or actuator 34. Accordingly, the head 38 may be specially shaped or marked with a pointer portion to indicate the approximate area of the work engaged by the head 38 which will be intersected by the beam B when it is generated.

In a modified embodiment of FIG. 5, notation 33 may refer to a lineal actuator such as a solenoid which, when the trigger 19 is pulled, applies a force to shaft 34 thereof forcing the head 38 to apply a further force against the outer surface of the work piece W2 so as to machine compress the work pieces together with a regulated force just before or as the beam B is generated. The solenoid 33 may include a force indicating transducer which becomes activated only when a resistance is experienced by the shaft 34 when it is forced against the work and the output of the transducer which is effected when it is so activated may be applied to an AND circuit which receives on its other input the output of the switch which is closed when the trigger 19 is pulled by hand. The output of such AND circuit, if so activated, may be applied to activate the energizing circuitry for the laser 25A permitting it to be pulsed or otherwise operated only when the head 38 of the shaft 34 is in forced engagement with the work, thus providing a safety interlock.

In yet another form of the safety interlock, a sensor may be disposed in the head 38 for sensing the work when the head is engaged thereagainst and may generate the described control signal which is applicable to wires extending through the shaft 37 to the described AND circuit. In its simplest form, the sensor may comprise two space separated contacts which are exposed to the end of head 38 wherein an electrical signal is conducted between the contacts through the work when the head 38 is engaged against the work and such signal may be passed through a wire or wires extending through the shaft 34 to the described AND control circuit to permit the laser 25A to be operated when the trigger 19 is pulled.

The laser 26A may be pulse operated as described to spot weld or drill selected positions of work aligned with the working end of the tool. An indication of the location of the work which will be intersected by the laser beam when the trigger is pulled may be had by noting the position of the head 38 or a protrusion or marker associated therewith which will define the point of intersection when it engages the work or is disposed immediately adjacent thereto.

Figure 6:
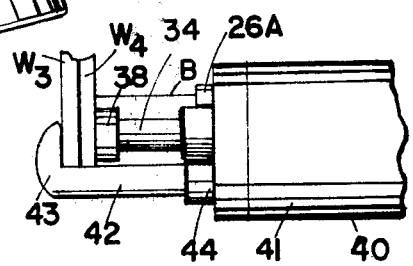
FIG. 6 shows the working head portion of a modified form of beam welding tool in clamping engagement between two work pieces being welded thereby.

In FIG. 6 is shown a modified form of the invention wherein the end of the barrel portion 41 of an electron gun or laser supported housing similar to that illustrated in FIGS. 1-3, is modified with the output 26 of the laser or electron gun adapted to project an intense radiation beam B parallel to the longitudinal axis of the barrel 41. A shaft 34 having a head portion 38 at its end and operable as described to be projected from the end of the barrel 41 is employed to compress the work pieces W3 and W4, which are illustrated as a plurality of sheets or otherwise shaped members, together against the head 43 of an L-shaped fitting 42 which is secured by means of a threaded base portion 44 to the end wall of the barrel 41. When the solenoid or actuator to which shaft 34 is attached is retracted, sufficient space is provided between the head 38 and head 43 to permit two or more pieces of work to be disposed therebetween. When the trigger 19 of the gun is pulled, the head 38 is projected by the solenoid to compress the two work pieces against the head 43 of the fitting 42 permitting the beam to be generated immediately thereafter, as described, and to spot weld the two units of work together in the area immediately in alignment with the head 38.

Figure 7:
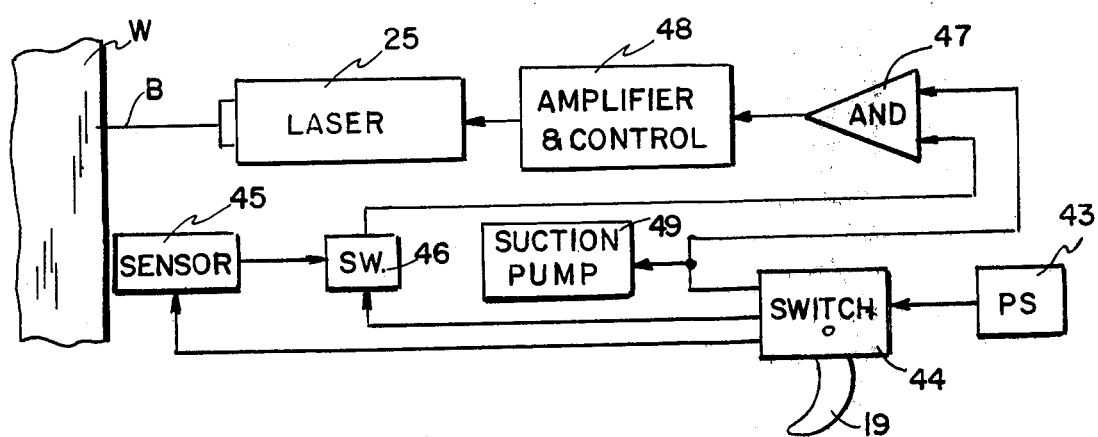
FIG. 7 is a schematic diagram showing a typical laser control and safety interlock for the tools provided herein.

FIG. 7 is a schematic diagram showing another form of safety interlock which may be employed to prevent pulsing the laser or electron gun when the tool described is not in engagement with work. The trigger 19 operates a spring biased, normally open multiple pole switch 44 which connects an electrical power supply PS denoted 43, such as line current or a battery to a sensor 45 and the input of a second normally open switch 46 having a switching input for closing same extending from the sensor 45. The sensor may be a normally open, actuator closed limit switch as described which closes when it is forced against a work assembly or any suitable device for properly sensing work, preferably to the exclusion of sensing other surfaces against which the tool may be accidentally or otherwise engaged. The output of sensor 45 closes the normally open switch 46 when it senses the work permitting current from supply 43 to be passed to an input of an AND switching circuit 47 which passes an output signal when its two inputs are so energized to a laser or electron beam controller 48 which contains amplifier and pulsing circuits for the laser or electron gun 25A causing the latter to emit an intense pulse of radiation as a beam B for the purpose described. The switch 44 also connects the battery 43 to a pump motor to operate same to drive a pump or suction blower for performing one or more functions to be described.

Figure 8:
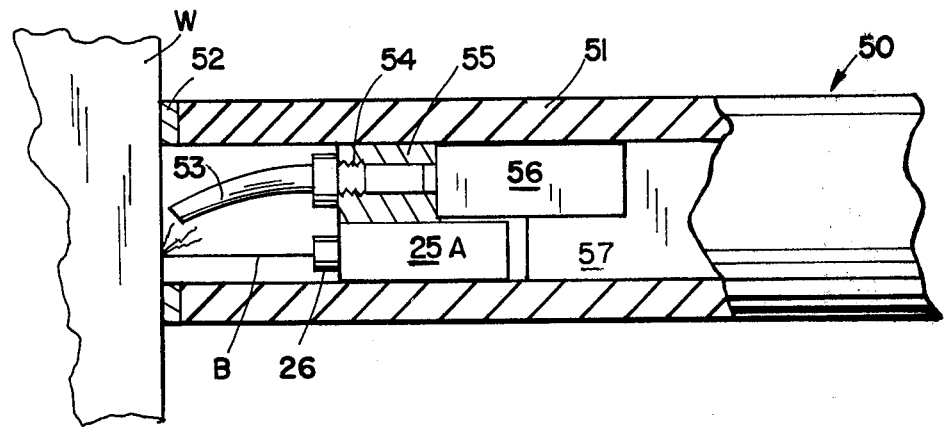
FIG. 8 is a side view with portions broken away for clarity of part of a hand held tool of the type provided in FIGS. 1-7 wherein sampling means is provided for sampling vaporous products generated when the laser beam intersects the work.

The apparatus illustrated in FIGS. 1-7 may also be employed in sampling material vaporized by the intense radiation pulse which intersects the work. FIG. 8 illustrates the working end 51 of a modified tool or gun 50 of the type described. In addition to providing a laser 25A at the end of the barrel of the gun, a small suction pump or fan 56 is supported within the end of the housing and has a nozzle 53 connected to its input and operable to receive material vaporized from the spot area of the work intersected by the intense radiation beam B. The end 54 of nozzle 53 is threaded to permit its removal and replacement on a fitting 55 connected to the pump or fan 56. The output of pump or suction blower 56 is connected to a sampling chamber or filter for retaining the vaporized material thereon to later analysis. Such material may also be immediately analyzed by suitable means 57 located in the gun housing.

The sensor 45 may be located at the end of retainer 22, on the head 38 of FIG. 5 or at the end of housing 16 or a protruding portion thereof. Said sensor may comprise a normally open limit switch closable when the tool end is brought against a workpiece, a magnetic or capacitance sensing element or space separated and exposed electrical contacts located to engage metal work and to complete a circuit for closing a switch or enabling a control, such as the AND logical switching circuit 47 of FIG. 7, to permit or effect pulsed operation of the laser or electron gun 25A. If such space-separated contacts are insulatedly supported at the end of a support such as retainer 23 or head 38 and the circuit they are in series with is connected to a source of electrical energy, completion of such circuit when the contacts engage metal work may operate a switch or relay to enable the laser to be operated thereafter when the trigger operated switch 44 is closed by hand.

FIG. 7 also shows the motor 49 for operating the suction pump or blower 56 of FIG. 8 which motor is energized when normally open trigger operated switch 44 is closed, to cause the suction pump or blower 56 to draw gas and vapor through the open ended nozzle 53 and the pump to the sample storage or analysis means 57. If the laser control 48 is operable to pulse energize the laser in housing 25 each time such control 48 is energized by current from power supply 43 gated thereto, switch 44 may comprise a conventional spring biased limit switch which opens when the trigger 19 is released. However, if the amplifier and control means 48 operates to pulse the laser at a given frequency when or while switch 44 is closed, the latter may be an override type switch which closes for a short time interval each time the trigger 19 is pulled so as to pulse energize the sensor 45, the pump motor 49 and control 48.

I claim:

1. A tool for welding a workpiece in a selected area comprising:
    a support defining a housing including a handle portion for holding and directing said housing in a given direction,
    welding radiation generating means supported within said housing and operable, when energized, to generate and direct a narrow beam of intense radiation longitudinally through said housing along a fixed path in a given direction, an opening at one end of said housing through which the radiation beam passes, first means supported by said housing and extending in said given direction for supporting the end of said housing a predetermined distance from the surface of an article to be welded by said intense radiation beam, second means at the end of said first means for prepositioning said tool with respect to a workpiece in a manner to indicate and define the location of the surface of said workpiece to be welded which will be intersected by the beam generated by said radiation generating means and passed through said opening, said first and second means having a common axis which is offset from said opening, said second means engaging said workpiece to be welded in a conforming manner to align the radiation beam with a preselected area of the workpiece to be welded, and switching means controlling the generation of said radiation beam whereby, when said second means is predeterminately engaged against the surface of a workpiece to be welded, radiation may be controllably generated by said radiation generating means and will intersect a predetermined area of said workpiece.

2. A tool in accordance with claim 1 wherein said radiation generating means is a laser having an output end for directing said beam of radiation toward and through said opening at said one end of said housing.

3. A tool in accordance with claim 2 wherein said second means is an elongated structural member supported by and protruding beyond the end of said housing from which the beam of said laser is directed.

4. A tool in accordance with claim 1 wherein said first and second means include means for engaging a fastener, aligning and prepositioning said housing with respect to said fastener.

5. A tool in accordance with claim 4 wherein said first and second means include means for engaging and aligning said housing with respect to the head of said fastener.

6. A tool in accordance with claim 4 wherein said second means is shaped and operable for holding a fastener in assembly with work during the welding operation.

7. A tool in accordance with claim 6 wherein said fastener is a screw fastener and said retaining means includes means for turning said screw fastener to effect a first fastening operation prior to the welding operation.

* * * * *